United States Patent
Evans et al.

(10) Patent No.: US 11,895,940 B2
(45) Date of Patent: Feb. 13, 2024

(54) ROTATIONAL SPROUTER SYSTEM

(71) Applicant: WoVa Labs, Inc., Twentynine Palms, CA (US)

(72) Inventors: Douglas Evans, Twentynine Palms, CA (US); Paul Naddaff, Newton, MA (US); Joel Schwarzbart, Irvine, CA (US); Ashley Legg, Düsseldorf (DE)

(73) Assignee: WoVa Labs, Inc., Twentynine Palms, CA (US)

( * ) Notice: Subject to any disclaimer, the term of this patent is extended or adjusted under 35 U.S.C. 154(b) by 0 days.

(21) Appl. No.: 18/126,888

(22) Filed: Mar. 27, 2023

(65) Prior Publication Data

US 2023/0301223 A1 Sep. 28, 2023

Related U.S. Application Data

(60) Provisional application No. 63/324,399, filed on Mar. 28, 2022.

(51) Int. Cl.
*A01G 31/04* (2006.01)
*A01C 1/02* (2006.01)

(52) U.S. Cl.
CPC .............. *A01C 1/02* (2013.01); *A01G 31/047* (2013.01)

(58) Field of Classification Search
CPC ................................. A01C 1/02; A01G 31/047
See application file for complete search history.

(56) References Cited

U.S. PATENT DOCUMENTS

| | | |
|---|---|---|
| 1,724,949 A | 8/1929 | Markey |
| 2,436,652 A | 2/1948 | Hsiang |
| 3,328,912 A | 7/1967 | Yull |
| 3,616,560 A | 11/1971 | Mun |
| 3,945,148 A | 3/1976 | Oyama |
| 4,006,557 A | 2/1977 | Sawyer |
| 4,086,725 A | 5/1978 | Li |
| 4,114,315 A | 9/1978 | Rinella |
| 4,144,671 A | 3/1979 | Lee |

(Continued)

FOREIGN PATENT DOCUMENTS

| | | | |
|---|---|---|---|
| CN | 105815202 | 8/2016 | |
| GB | 1382262 A | * 1/1975 | ............... A01C 1/02 |

(Continued)

OTHER PUBLICATIONS

"Egl 55 220v50hz—EasyGreen" easygreen website. accessed at https://www.easygreeen.com/egl-55-220v50hz-all/ on Feb. 23, 2023.

(Continued)

*Primary Examiner* — Kristen C Hayes

(74) *Attorney, Agent, or Firm* — Van Pelt, Yi & James LLP

(57) ABSTRACT

A rotational sprouter system, is disclosed including: a chamber comprising an opening; a porous end cap that is configured to engage the opening of the chamber; a reservoir; wherein the chamber and the porous end cap are at least partially submerged in the reservoir such that an interior of the chamber is in communication with the reservoir via the porous end cap; and wherein the porous end cap is adapted to engage a drive mechanism that is configured to rotate the chamber and the porous end cap while the chamber and the porous end cap are at least partially submerged in the reservoir.

23 Claims, 16 Drawing Sheets

(56) References Cited

U.S. PATENT DOCUMENTS

| | | | |
|---|---|---|---|
| 5,025,589 A | 6/1991 | Park | |
| 5,873,197 A * | 2/1999 | Rowse | A01C 1/02 47/16 |
| 6,442,892 B1 | 9/2002 | Azoulay | |
| 6,840,007 B2 | 1/2005 | Leduc | |
| 7,134,240 B1 | 11/2006 | Neal | |
| 7,748,165 B2 * | 7/2010 | Santoli | A01G 31/02 47/61 |
| 10,356,984 B2 | 7/2019 | Samadpour | |
| 11,154,627 B2 * | 10/2021 | Greenfield | A61L 2/0047 |
| 2004/0237396 A1 * | 12/2004 | Castillo | A01C 1/02 47/61 |
| 2014/0165468 A1 * | 6/2014 | Roeser | A01G 31/047 47/32.7 |
| 2016/0206136 A1 | 7/2016 | Storek | |
| 2019/0008105 A1 | 1/2019 | Bacher | |
| 2020/0100434 A1 | 4/2020 | Samadpour | |
| 2021/0137024 A1 * | 5/2021 | Choi | A01G 9/022 |
| 2021/0243975 A1 * | 8/2021 | Farmer | A01G 9/0293 |

FOREIGN PATENT DOCUMENTS

| | | | |
|---|---|---|---|
| KR | 100522032 | | 10/2005 |
| KR | 200424541 | | 8/2006 |
| KR | 100996543 | | 11/2010 |
| KR | 101451343 | | 10/2014 |
| KR | 101639626 | | 7/2016 |
| KR | 20170007979 | | 1/2017 |
| KR | 20170007979 A | * | 1/2017 |
| KR | 20180076076 A | * | 7/2018 |
| KR | 101891931 | | 8/2018 |
| KR | 101930424 | | 12/2018 |
| KR | 20180130882 | | 12/2018 |
| KR | 102047602 | | 11/2019 |
| KR | 20230000019 A | * | 1/2023 |
| TW | 201023736 | | 7/2010 |
| WO | WO-2017075689 A1 | * | 5/2017 |

OTHER PUBLICATIONS

"Emerald HD Super Sprouters!—Sprout Machine Equipment, Water Recycling, Sprout Disinfection . . . " sprouters website, access at sprouters.com/Sprouting_Equipment_Emerald.html on Feb. 23, 2023.

"Freshlife 3000 Automatic Sprouter" Tribest Website, accessed at https://tribest.com/products/freshlife-3000-fl-3000-a on Feb. 23, 2023.

"ISS Rota-Tech Rotary Drum—International Specialty Supply" Sproutnet website, access at https://sproutnet.com/product/iss-rota-tech-rotary-drum/ on Feb. 23, 2023.

* cited by examiner

ROTATIONAL SPROUTER SYSTEM

CROSS REFERENCE TO OTHER APPLICATIONS

This application claims priority to U.S. Provisional Patent Application No. 63/324,399 entitled ROTATIONAL SPROUTER SYSTEM filed Mar. 28, 2022 which is incorporated herein by reference for all purposes.

BACKGROUND OF THE INVENTION

Sprouting is the process of mass germinating vegetable seeds and harvesting them as a food source. Traditionally, sprouting at home is performed using mason jars. Sprouting, while somewhat simple, requires the user to rinse/water the sprouts 2-3 times a day for the course of the grow. This highly manual process can be inconvenient and if not done correctly, can result in at least poor crop growth or at worst, increased fungal/bacterial risk.

Conventionally, commercial sprouting devices feature large drums that are filled with seeds and water and can be actuated to facilitate the germination and growth of such seeds. However, some drawbacks of these commercial sprouting devices are that they are mechanically actuated along multiple axes and therefore, are more likely to suffer mechanical failures but are also expensive to repair. Additionally, commercial sprouting devices also expensive to purchase, require large amounts of space, and the finished sprouts need to be packaged in plastic and shipped to retailers in refrigerated trucks. The sprouts can be compromised at several points along the way during shipping. The sprouts also have a shelf life of only several days.

BRIEF DESCRIPTION OF THE DRAWINGS

Various embodiments of the invention are disclosed in the following detailed description and the accompanying drawings.

DETAILED DESCRIPTION

Figure 1:
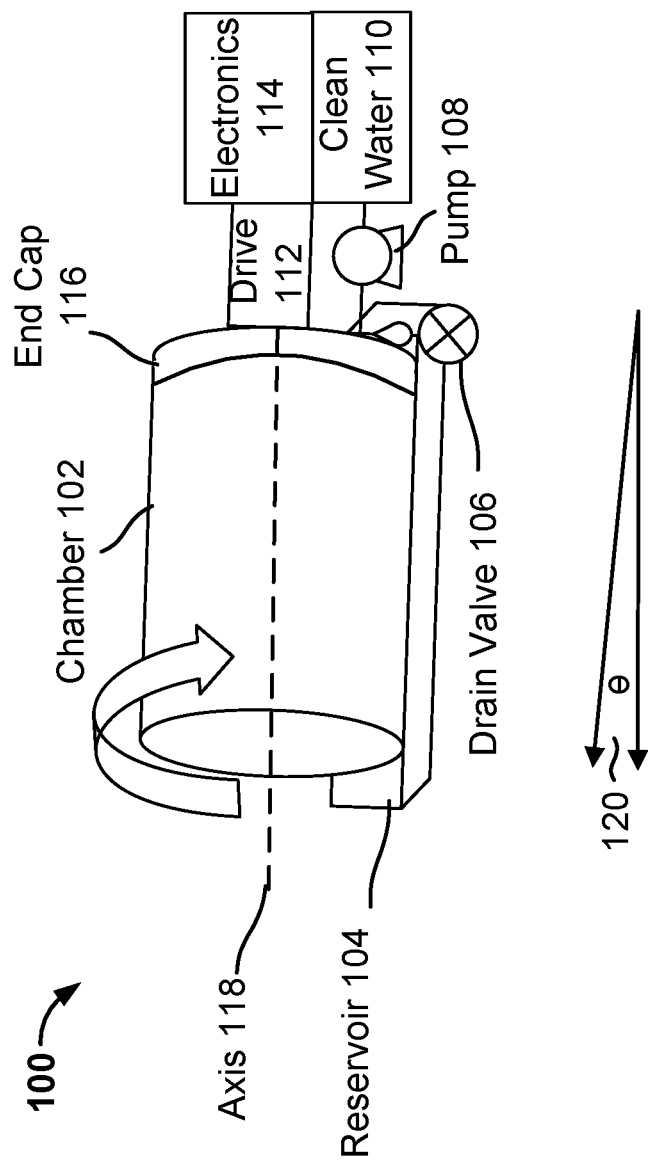
FIG. 1 is a diagram showing an embodiment of a rotational sprouter system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a rotational sprouter system are described herein. The rotational sprouter system includes an opening. In various embodiments, the chamber comprises a cylinder or a frustrum shape with one open end. The rotational sprouter system further includes a porous end cap that is configured to engage with the opening of the chamber. Seeds that are to be germinated are placed inside the chamber prior to engaging the open end of the chamber with the porous end cap. The rotational sprouter system also includes a reservoir in which clean water can be filled (e.g., manually or via a water pump). The source of the clean water can be a clean water storage that is part of the rotational sprouter system or a connection to a building's fresh water architecture. The chamber coupled to the porous end cap are at least partially submerged into the reservoir such that the interior of the chamber is in communication with the reservoir via the porous end cap. In various embodiments, the "reservoir" can be, for example, but not limited to any tray, tub, pan, or basin in which the chamber can be partially submerged in water. The pores of the end cap that is engaged with the chamber are shaped and sized such that water from the reservoir can flow in and out of the chamber (e.g., to hydrate the seeds contained inside) but that the seeds and sprouts grown from the seeds cannot pass through. The porous end cap is adapted to engage a drive mechanism that is configured to rotate the chamber that is engaged with the porous end cap while the chamber and the porous cap are at least partially submerged in the reservoir.

FIG. 1 is a diagram showing an embodiment of a rotational sprouter system. Rotational sprouter system 100 includes detachable chamber 102. Chamber 102 includes a single opening that can be covered by end cap 116. As will be described in further detail below, in various embodiments, end cap 116 comprises pores to allow for water and air to flow through. To start the sprouting process, seeds are first placed inside chamber 102 by a user, while detached from rotational sprouter system 100, via the opening. The opening is covered with end cap 116 by the user and then covered chamber 102 is engaged by the user with drive mechanism 112 of rotational sprouter system 100. For example, end cap 116 is, at least partially, made of stainless steel and/or plastic. The type of seeds that are added to chamber 102 can be detected by rotational sprouter system 100 in various ways. In a first example, the user can enter the type of seeds via a user interface that is presented by electronics 114 or a user interface that is presented at an associated application that is executing on a client device that is wirelessly coupled with rotational sprouter system 100. In a second example, the type of seeds can be detected by a scanner of electronics 114 scanning a code or other identifier on a package from which the seeds were enclosed. In a third example, the type of seeds can be detected by electronics 114 based on an image obtained of the seeds (e.g., from a camera that is pointed towards the inside of chamber 102). In response to the determination of the type of seeds that are contained within chamber 102, electronics 114 is configured to activate components within rotational sprouter system 100 to modify the environment of the seeds within or around chamber 102 to promote seed germination and sprout growth according to a seed profile corresponding to that seed type. In various embodiments, electronics 114 comprises a memory that is configured to store one or more types of seed profiles. Each seed profile comprises computer code that when executed by a process of electronics 114, controls components of rotational sprouter system 100 to execute a sequence of seed development phases. For example, each seed development phase comprises a time duration within which the drive mechanism is to be activated in a specified manner (e.g., rotating in a given direction at a specified rotations per minute (RPM)) and/or a set of target environment conditions (e.g., temperature, humidity) within chamber 102 is to be maintained for that phase.

During the execution of a seed profile associated with the type of seeds that are detected within chamber 102, electronics 114 is configured to activate a release of clean water from clean water storage 110 to at least partially fill reservoir 104 in which chamber 102 is partially submerged. In some embodiments, electronics 114 can activate an irrigation system to release clean water into reservoir 104. In some embodiments, the irrigation system comprises pump 108 that is configured to pump clean water from clean water storage 110 into reservoir 104. While a cross section of reservoir 104 is shown in FIG. 1 to illustrate that chamber 102 is partially submerged within, in various embodiments, reservoir 104 comprises a tray with a convex body in which chamber 102 can sit. The pumping of clean water into reservoir 104 will allow at least some of the clean water to flow into chamber 102 via the pores of end cap 116 that is covering the opening of chamber 102. Furthermore, during the execution of the selected seed profile, electronics 114 is also configured to activate the rotation of drive mechanism 112 via a motor (not shown in FIG. 1). Because end cap 116 of chamber 102 is engaged with drive mechanism 112, the rotation motion of drive mechanism 112 causes end cap 116 to rotate. Due to end cap 116 being coupled to the opening of chamber 102, when end cap 116 rotates, chamber 102 is also caused to rotate about its axis, axis 118. For example, the seed profile can dictate, for each seed development phase, the type of motion (e.g., in either the clockwise rotation, counterclockwise rotation, and/or both) that drive mechanism 112 should perform, the duration of such rotational motion, the speed of such rotational motion, whether clean water should be pumped into the reservoir, and/or whether water in reservoir 104 and also in chamber 102 should be drained out of reservoir 104 by activating the opening of the drain valve below the bottom of reservoir 104. Alternative to using the draining reservoir 104 using the drain valve, a user can also manually drain reservoir 104 by pouring out its water.

In a first example, in at least one seed development phase in a seed profile that is executed by electronics 114, water is flooded into reservoir 104 via pump 108 so that at least a portion of the water can flow into chamber 102 to hydrate the seeds therein and drive mechanism 112 is activated to rotate chamber 102 about axis 118 so that the seeds can be agitated to become more thoroughly coated in water. In a second example, in at least one seed development phase in a seed profile that is executed by electronics 114, drain valve 106 is caused to be opened so that water from reservoir 104 and chamber 102 can drain out of reservoir 104 to remove moisture from the seeds. In some embodiments, chamber 102 is not parallel to the surface on which rotational sprouter system 100 is resting such that when drain valve 106 is opened, the water that had flowed into chamber 102 through end cap 116 flows out through end cap 116 and into drain valve 106 via gravity, which speeds up the draining of water from chamber 102. Put another way, angle θ 120 between the surface of chamber 102 relative to the plane/surface of rotational sprouter system 100 is non-zero to ensure a tilt of chamber 102 relative to the surface on which rotational sprouter system 100 is placed. For example, angle θ 120 between the surface of chamber 102 relative to the plane/surface of rotational sprouter system 100 can be made non-zero by virtue of the frustrum shape of chamber 102 (e.g., the diameter of chamber 102 may be greater at the opening/end cap 116 end than the diameter of the closed end) or by the angle of reservoir 104 in which chamber 102 sits. Water that is drained from reservoir 104 can flow into a used water storage, a sink, or a drain via a tube (not shown in FIG. 1). In a third example, in at least one seed development phase in a seed profile that is executed by electronics 114, after water has been drained from reservoir 104, drive mechanism 112 is activated to rotate chamber 102 about axis 118 such that the sprouts that have germinated from the seeds can be agitated to spread out within the chamber 102 to promote more airflow among the sprouts, which will encourage growth and/or discourage fungal/bacterial growth from trapped moisture. At the end of the execution of a seed profile/the growing process, the user can disengage end cap 116 from drive mechanism 112 and either harvest/remove the sprouts from chamber 102 or directly place chamber 102 with the sprouts therein in the refrigerator.

In some embodiments, the execution of all the seed development phases in a seed profile can take several days (e.g., two to seven days). For example, prior to storing the sprouts in chamber 102 in the refrigerator, porous end cap 116 can be swapped out for a slightly ventilated end cap to achieve ideal storage conditions inside of a refrigerator.

The following are example descriptions of actions to be performed by the rotational sprouter system on different seed types according to their respective seed profiles:

1) Seed profile: Broccoli, Salad Mix

Soak: Fill 25%, Rotate slowly for 8 hours. Drain.

Rinse: 2 times daily for 5 days. Each day increase 20% fill water height and rotate quickly back and forth for 3 minutes. Then drain.

Hold: In between rinses, very slowly rotate indefinitely.

Harvest day: Max fill water. Rotate back and forth quickly for 3 minutes. Then drain.

2) Seed Profile: Lentils

Soak: Fill 50%, Rotate slowly for 8 hours, Drain.

Rinse: 2 times daily for 3 days. Each day increase 30% fill water height and rotate quickly back and forth for 3 minutes. Then drain.

Hold: In between rinses, very slowly rotate indefinitely

Harvest day: Max fill water. Rotate back and forth quickly for 3 minutes. Then drain.

In some embodiments, electronics 114 includes one or more sensors and climate controls/subsystems. Example sensors may include humidity, temperature, water level, camera, airflow, and accelerometer sensors. For example, at least some sensors can be placed inside chamber 102 and/or some outside of chamber 102. In response to measurements from the sensors, environmental subsystems such as a fan, a heater, and a (e.g., ultraviolet (UV)) light can be dynamically and programmatically activated to adjust the environment within chamber 102 or outside chamber 102 to cause the sensor measurements to match target environment measurements that are specified for different seed development phases for an executed seed profile. In a first example, a fan can be activated to blow air into chamber 102 to cool the inside temperature and/or to reduce the humidity within. In a second example, a corresponding UV light can be activated to sanitize the seeds prior to germination and/or to stimulate sprout growth after germination. In a third example, if the humidity within chamber 102 falls below a target amount that is specified in the seed profile for the current seed development phase, then electronics can trigger for the release for additional water into the reservoir and rotation of chamber 102 within reservoir 104. In response to a detected accelerometer measurement that is greater than a given threshold, electronics 114 can send an alert (e.g., to an application executing at a client device) to indicate that rotational sprouter system 100 is undesirably sliding/moving while in operation.

In some embodiments, a current sensor coupled to drive mechanism 112 can be used to detect a deviation in current that might be indicative of a problem/failure/jam of drive mechanism 112 or an associated motor.

While not shown in FIG. 1, in some embodiments, rotational sprouter system 100 may include a sanitization module that can be activated by electronics 114 to release sanitizing liquid into chamber 102 to sanitize the seeds during an early seed development phase in a seed profile (e.g., to clean the seeds prior to germination or after the growth of sprouts has completed). For example, the sanitized seeds are then rinsed with water via clean water being pumped into reservoir 104 and then subsequently drained from reservoir 104.

While not shown in FIG. 1, in some embodiments, rotational sprouter system 100 comprises a user interface (UI) that enables the user to control the system and obtain its status. In some embodiments, the UI is connected to an optional client device (e.g., a smartphone/tablet) application (e.g., via Wifi/Bluetooth/NFC/cellular), which enables messages (e.g., alerts) to be sent from rotational sprouter system 100 to the smartphone/tablet. This smartphone/tablet application could also be used to remotely control rotational sprouter system 100, update firmware, and expose important information about the system's status. For example, the UI may include dials and/or buttons that can initiate the process of automatically soaking, rinsing and watering the seeds and sprouts.

In some embodiments, the UI of rotational sprouter system 100 is configured to enable the user to input the type of seeds (and how many) that are being sprouted in chamber 102. In some embodiments, the UI of rotational sprouter system 100 is configured to allow the user to stop the growing cycle at any time. In some embodiments, the UI of rotational sprouter system 100 is configured to enable the user to determine the system's current status (e.g., how much time is left until crop is complete, water level, errors, etc.). In some embodiments, the UI of rotational sprouter system 100 is configured to ensure a simple and convenient user experience. In some embodiments, the UI of rotational sprouter system 100 is configured to enable the user to connect their mobile device to the system to perform control, receive alerts, and/or configure settings.

In some embodiments, detachable components of rotational sprouter system 100, such as, chamber 102, end cap 116, reservoir 104, and clean water storage 110, for example, can be modularly replaced with different instances of the same component. Furthermore, the detachable components of rotational sprouter system 100 are made of machine-washable materials (e.g., glass, plastic, and/or stainless steel).

In some embodiments, rotational sprouter system 100 is a countertop product that grows a crop of sprouts with minimal user interaction during the growing process. Safety, convenience, and crop quality are the guiding principles of the system. The user will add seeds and water one time (at the beginning of the process) and not need to interact with the sprouts until harvesting.

In some embodiments, chamber 102 can have a volume of 0.5 to 1 gallon. In some other embodiments, chamber 102 is large enough to hold at least 3-10 gallons of mature sprouts.

In some embodiments, the dimensions of rotational sprouter system 100 is 15"×15"×15".

Figure 2:
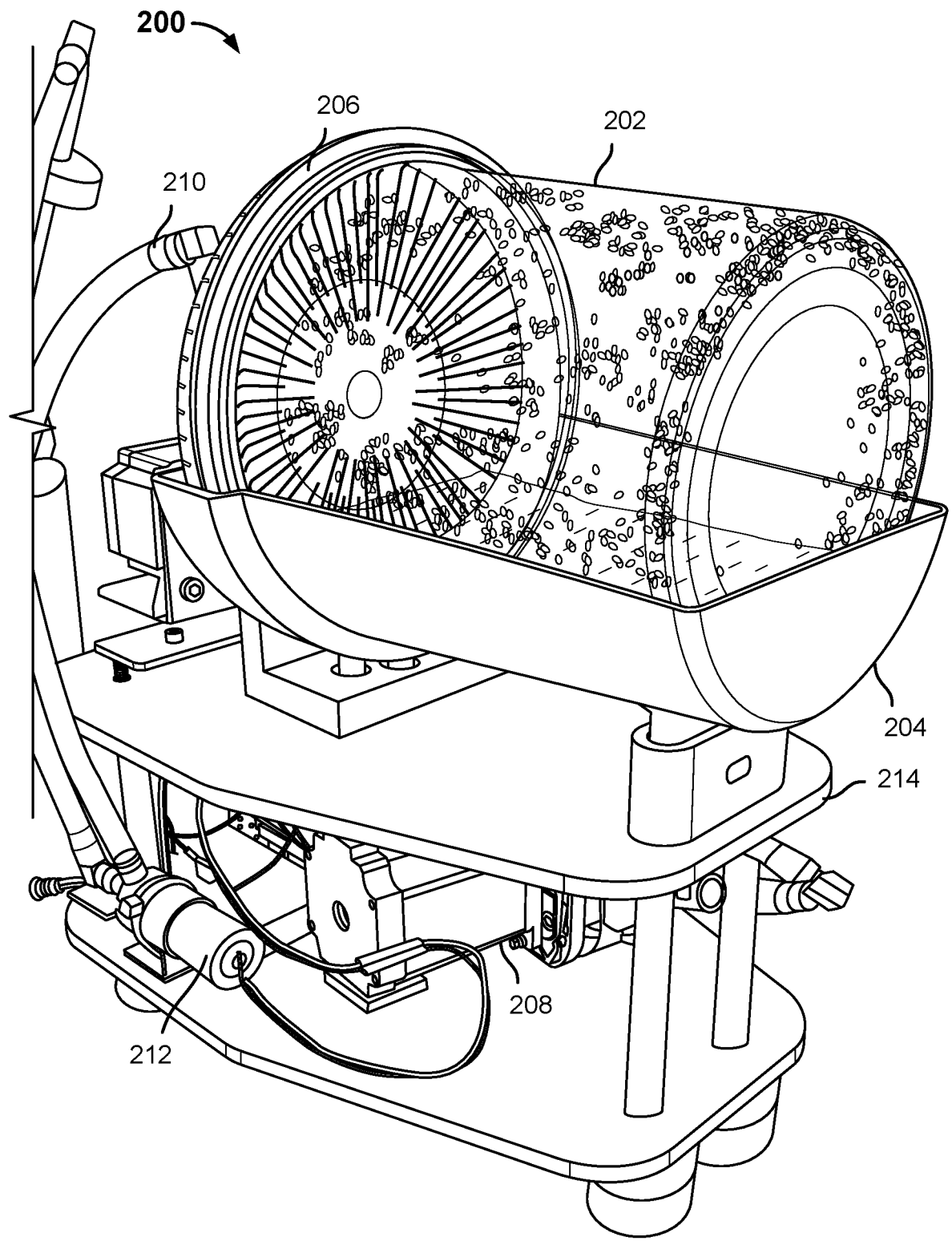
FIG. 2 is a diagram showing an example rotational sprouter system in operation in accordance with some embodiments.

FIG. 2 is a diagram showing an example rotational sprouter system in operation in accordance with some embodiments. In some embodiments, rotational sprouter system 100 of FIG. 1 can be implemented using the example of rotational sprouter system 200 that is shown in FIG. 2. Chamber 202 was partially filled with seeds before its opening was covered by end cap 206. Then, chamber 202 was engaged via its end cap to a drive mechanism of rotational sprouter system 200. Reservoir 204 is coupled to base 214 to keep it in place. In the example of FIG. 2, water has already been added to reservoir 204, in which chamber 202 is partially submerged. As shown in FIG. 2, end cap 206 is porous by virtue of featuring radial slits that also extend over the lip of the opening of chamber 202. In other examples, the pores of end cap 206 may not be slits, slits that are not arranged radially, and/or also include agitator bars extending from end cap 206 and into the inside of chamber 202. Due to the porous nature of end cap 206, clean water that is pumped by pump 212 via tubing 210 into reservoir 204 from a clean water storage (not shown) flows through the pores of end cap 206 and into chamber 202. As a result, water is retained in chamber 202 to hydrate the seeds contained inside so long as a drain valve (which is occluded in the diagram of FIG. 2) at the bottom of reservoir 204 remains closed. Motor 208, which is coupled to a drive mechanism (which is occluded by end cap 206), can be activated by the electronics (not shown) of rotational sprouter system 200 to cause the drive mechanism to rotate. The drive mechanism is coupled to end cap 206 (at the center of cap 206) and as a consequence of activating motor 208, the rotation of the drive mechanism will transfer to the rotation of both end cap 206 and chamber 202 (due to the friction of the seal between the opening of chamber 202 and end cap 206). As such, chamber 202 is caused by an activated motor 208 and in turn, the drive mechanism, to rotate within reservoir 204 about its axis. Alternatively, the drive mechanism (and subsequently, end cap 206 and chamber 202) can be rotated manually via a crank, dial, or wheel, for example. The rotation of chamber 202 will allow for the mixture of seeds and water (as shown in FIG. 2) to fully hydrate the seeds to enable successful sprouting. The rotational movement of chamber 202 can break up clumps of seeds that would otherwise not become fully coated in water without such movement. In some embodiments, this effect could also be achieved by "fins" or other such features (not shown in FIG. 2) embedded in the inner walls of chamber 202. Depending on the different seed development phases of the seed profile (which corresponds to a type of seeds that is detected within chamber 202) that is currently being executed by the electronics of rotational sprouter system 200, the drain valve on the bottom of reservoir 204 can be activated to open to enable water to drain out of reservoir 204 and also out of chamber 202. In some embodiments, chamber 202 is angled at a non-zero angle relative to the surface on which rotational sprouter system 200 sits and as such, when the drain valve is activated to open, water is moved by gravity out of chamber 202 through the pores of end cap 206, and down through the drain valve (e.g., into a used water collection/storage or directly into a sink/drain). Motor 208 can still be activated to cause rotation of chamber 202 within reservoir 204 regardless of whether the drain valve is open or close, and regardless of whether water remains in reservoir 204 or not. For example, some time after water has been drained from reservoir 204 via the opening of the drain valve, the seeds inside chamber 202 have germinated into sprouts. During this seed development phase, motor 208 can be activated to cause chamber 202 to rotate in one or more directions to cause the sprouts within to spread out and not form clumps that discourage healthy growth.

Figure 3:
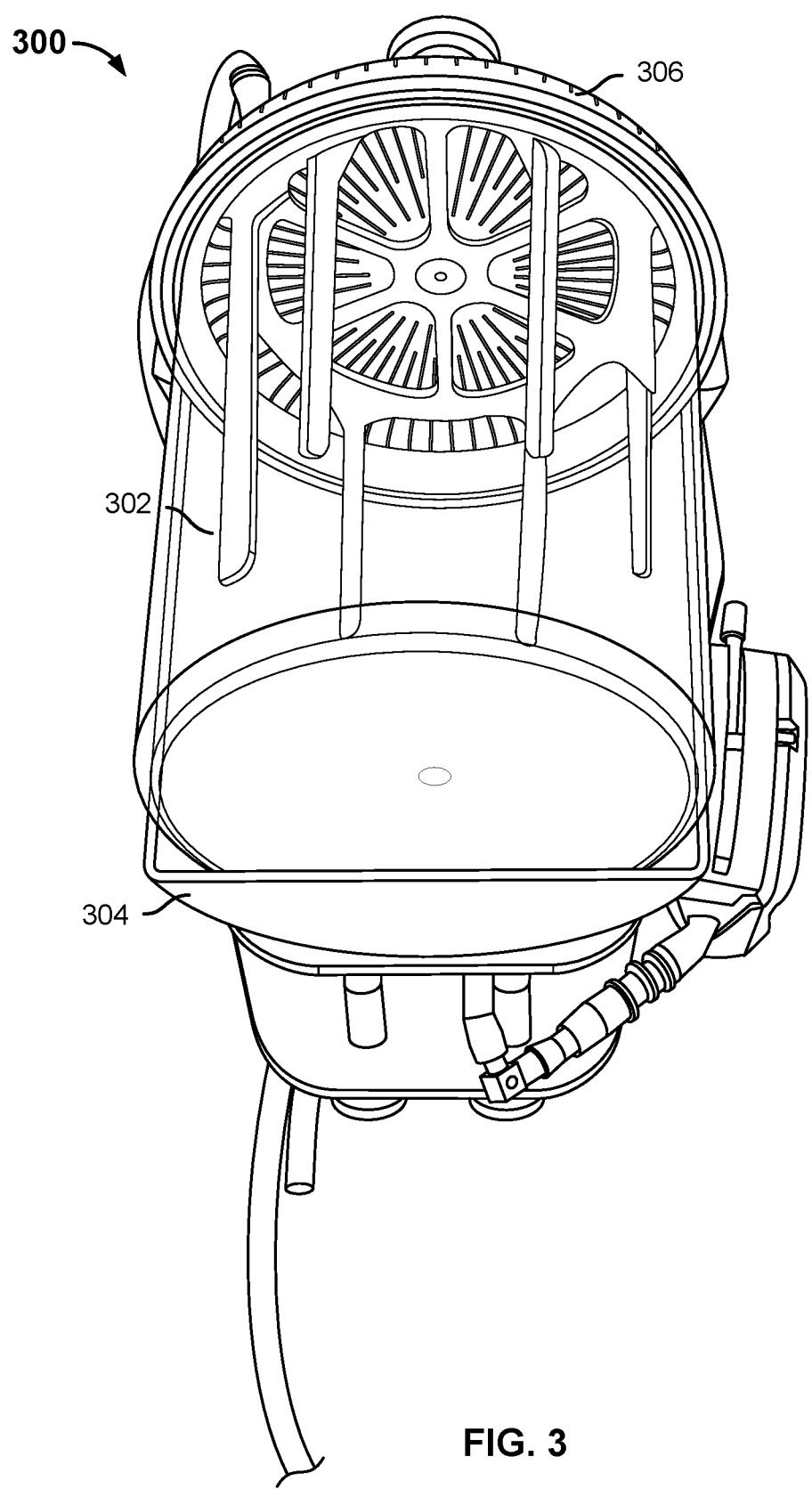
FIG. 3 is a diagram showing another example rotational sprouter system in accordance with some embodiments.

FIG. 3 is a diagram showing another example rotational sprouter system in accordance with some embodiments. In some embodiments, rotational sprouter system 100 of FIG. 1 can be implemented using the example of rotational sprouter system 300 that is shown in FIG. 3. Rotational sprouter system 300 is similar to rotational sprouter system 200 of FIG. 2 only that rotational sprouter system 300 is shown from a different angle in FIG. 3 than rotational sprouter system 200 was shown in FIG. 2. Chamber 302, which is sitting in reservoir 304, is shown without seeds or water contained therein. End cap 306 that is coupled to the opening of chamber 302 includes agitator bars that extend inside chamber 302. The agitator bars of chamber 302 can help to break apart clusters of seeds and/or sprouts that are grown inside chamber 302 to provide for better coating of water around the seeds and/or better airflow around the sprouts.

Figure 4:
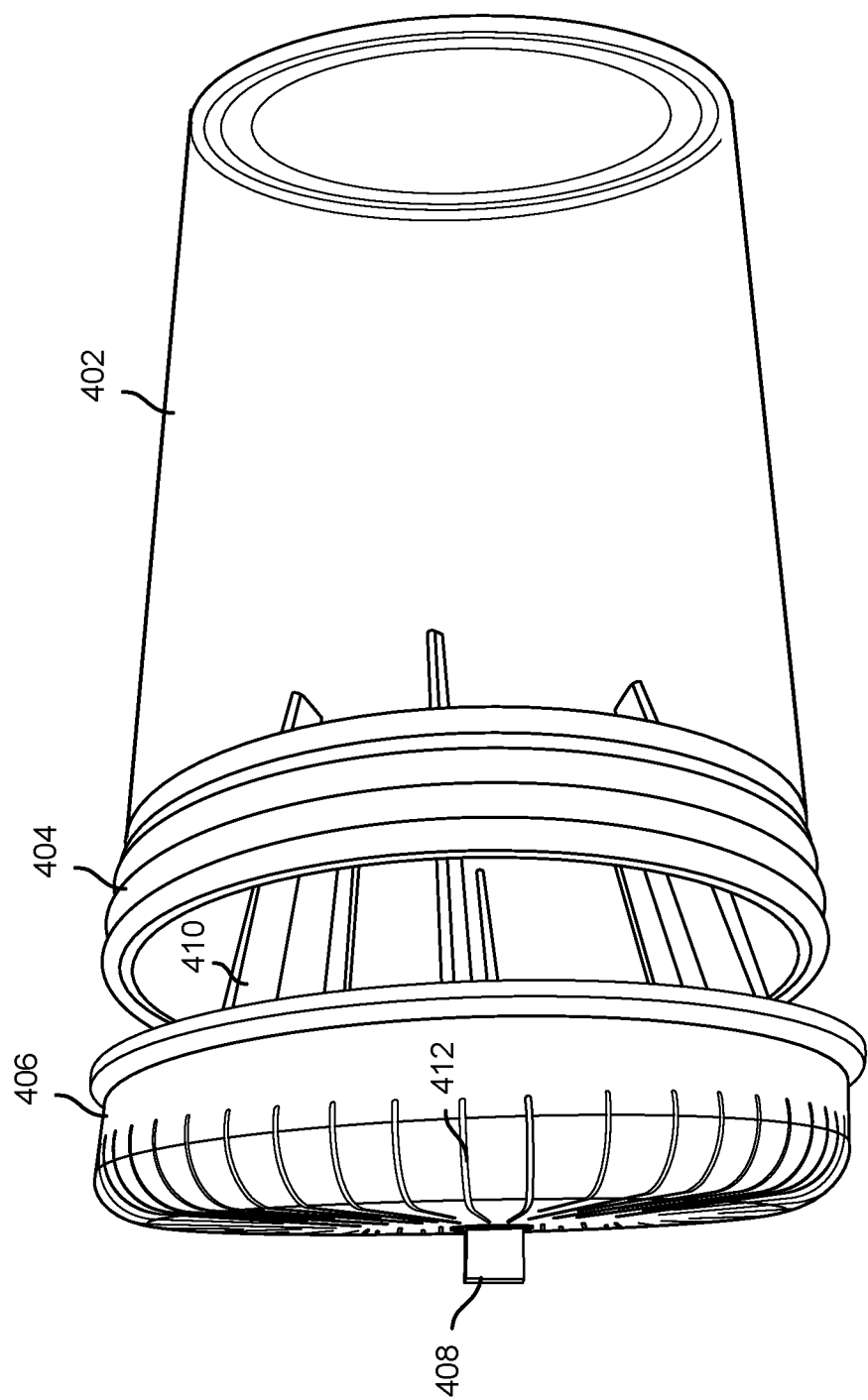
FIG. 4 is a diagram showing examples of an end cap and a chamber in accordance with some embodiments.

FIG. 4 is a diagram showing examples of an end cap and a chamber in accordance with some embodiments. In some embodiments, chamber 102 and end cap 116 of rotational sprouter system 100 of FIG. 1 can be implemented with the examples of chamber 402 and end cap 406 of FIG. 4. In the example of FIG. 4, chamber 402 is made of a transparent or translucent material such as glass or plastic. The shape of chamber 402 is shown to be a frustrum but chamber 402 can also be a cylinder in other examples. The outside of chamber 402 near its opening is lined with gasket 404. For example, gasket 404 is made of a silicone or another compressible material. End cap 406 is configured to engage with chamber 402 by at least partially covering gasket 404. The seal created between end cap 406 and chamber 402 by gasket 404 will keep end cap 406 attached to chamber 402 and also enable a rotational motion of end cap 406 to transfer to chamber 402. Put another way, when end cap 406 is engaged with chamber 402, an active rotation of end cap 406 by a drive mechanism of the rotational sprouter system will cause chamber 402 to similarly rotate. End cap 406 comprises peg 408 at its center. The center of end cap 406 aligns with the center axis of chamber 402 and so when end cap 406 is engaged into a drive mechanism (when peg 408 slides and locks into a slot of the drive mechanism), the rotation of the drive mechanism causes end cap 406 and chamber 402 to rotate about chamber 402's axis. In the example of FIG. 4, end cap 406 includes slits 412 that extend radially from the center of end cap 406. To ensure that water flows out from the inside of chamber 402 when the reservoir in which chamber 402 sits in the rotational sprouter system drains (and does not get trapped inside chamber 402), slits 412 extend over the lip of the opening of chamber 402. While the pores of end cap 406 are shown as slits that extend radially from the center of end cap 406, in other examples, the pores of end cap 406 can be any shape and in any arrangement such that only water and not seeds can pass through the pores. End cap 406 also includes (six) agitator bars 410 that extend into chamber 402, which also rotate along with end cap 406 to mix, agitate, and separate the seeds and sprouts contained within chamber 402.

Figure 5:
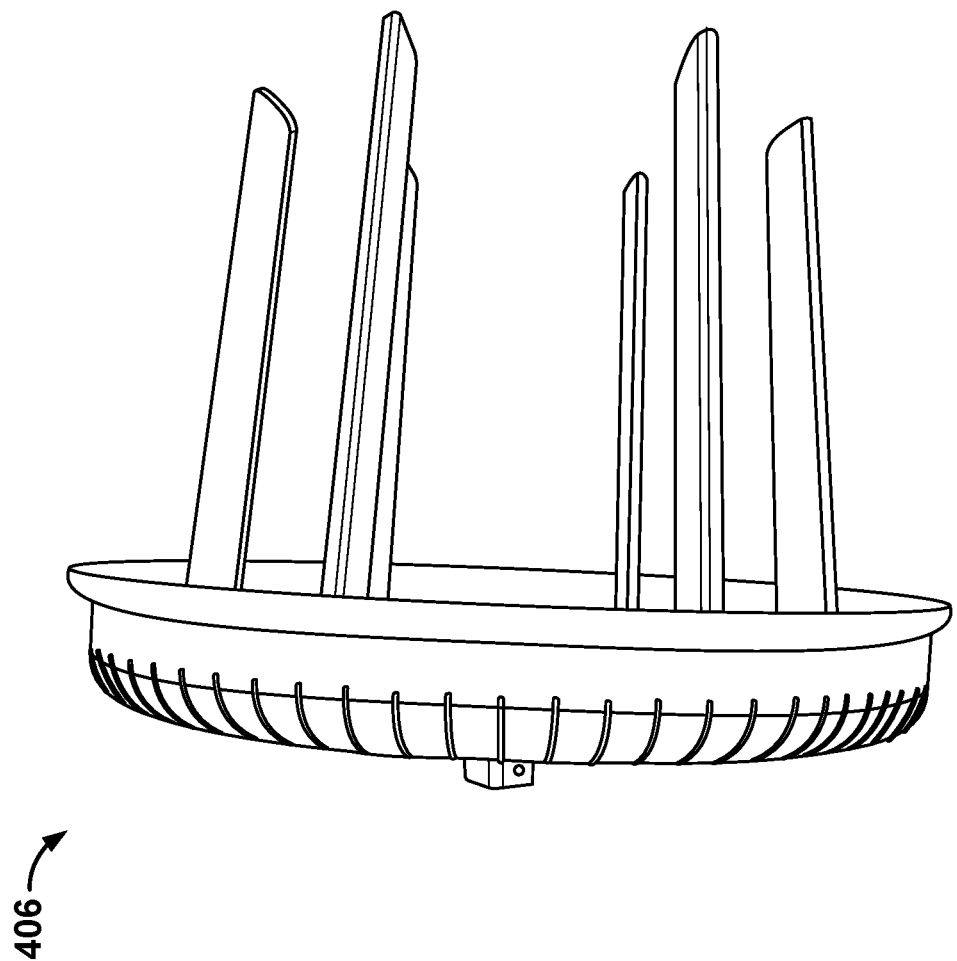
FIG. 5 is a diagram showing an example end cap in accordance with some embodiments.

FIG. 5 is a diagram showing an example end cap in accordance with some embodiments. The example end cap that is shown in FIG. 5 is a view of end cap 406 of FIG. 4 but without the chamber that had occluded a portion of the agitator bars.

Figure 6:
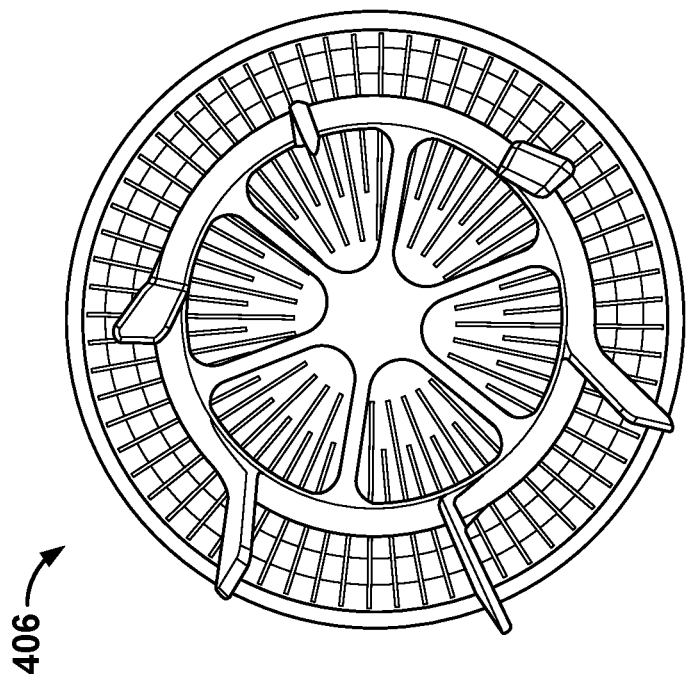
FIG. 6 is a diagram showing an example end cap in accordance with some embodiments.

FIG. 6 is a diagram showing an example end cap in accordance with some embodiments. The example end cap that is shown in FIG. 6 is another view of end cap 406 of FIG. 4 but without the chamber that had occluded a portion of the agitator bars. In some embodiments, all the agitator bars are part of the same molded material (e.g., plastic). As such, the agitator bars can be added onto and removed from the end cap as one piece.

Figure 7:
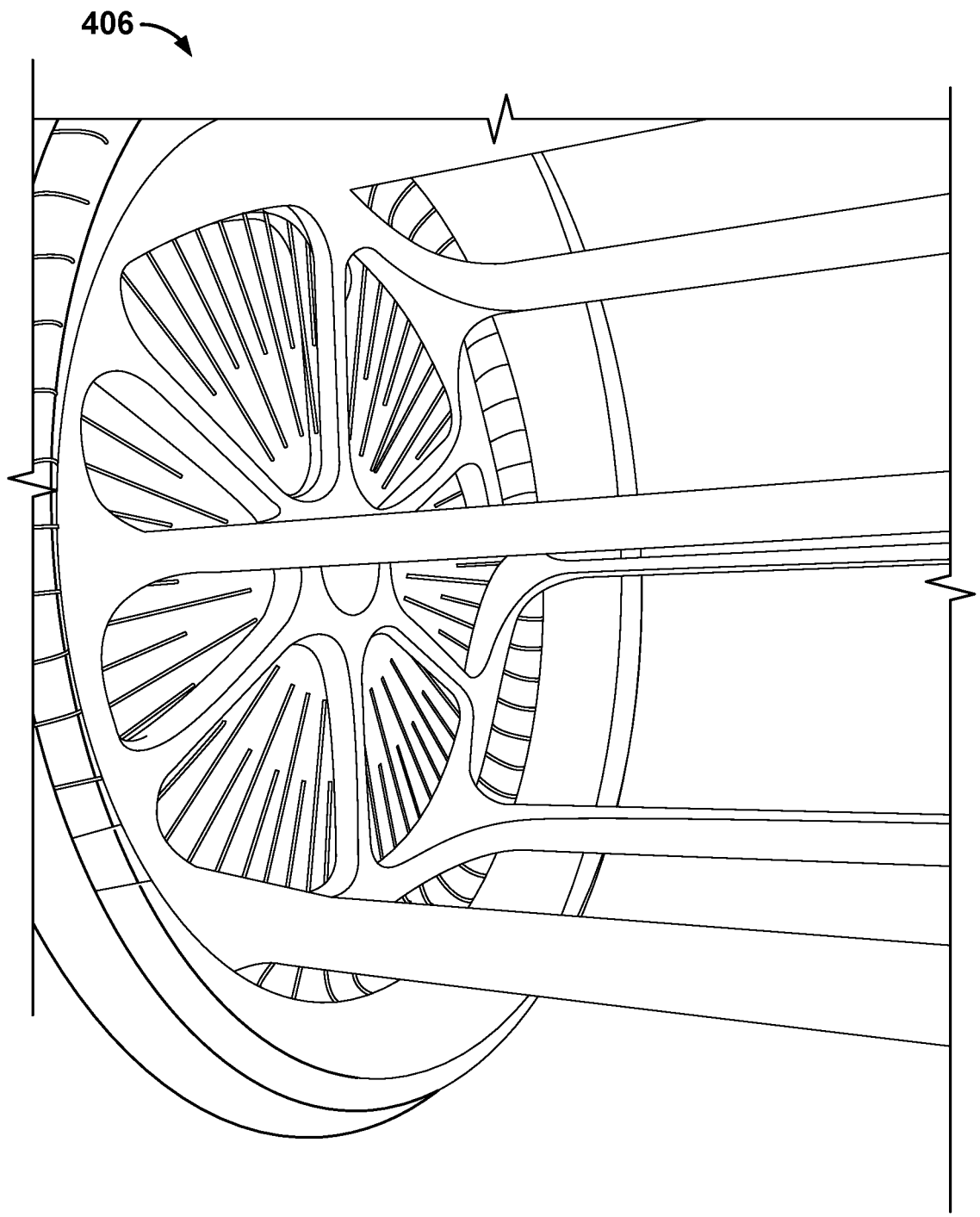
FIG. 7 is a diagram showing an example end cap in accordance with some embodiments.

FIG. 7 is a diagram showing an example end cap in accordance with some embodiments. The example end cap that is shown in FIG. 7 is a close-up view of end cap 406 of FIG. 4.

Figure 8:
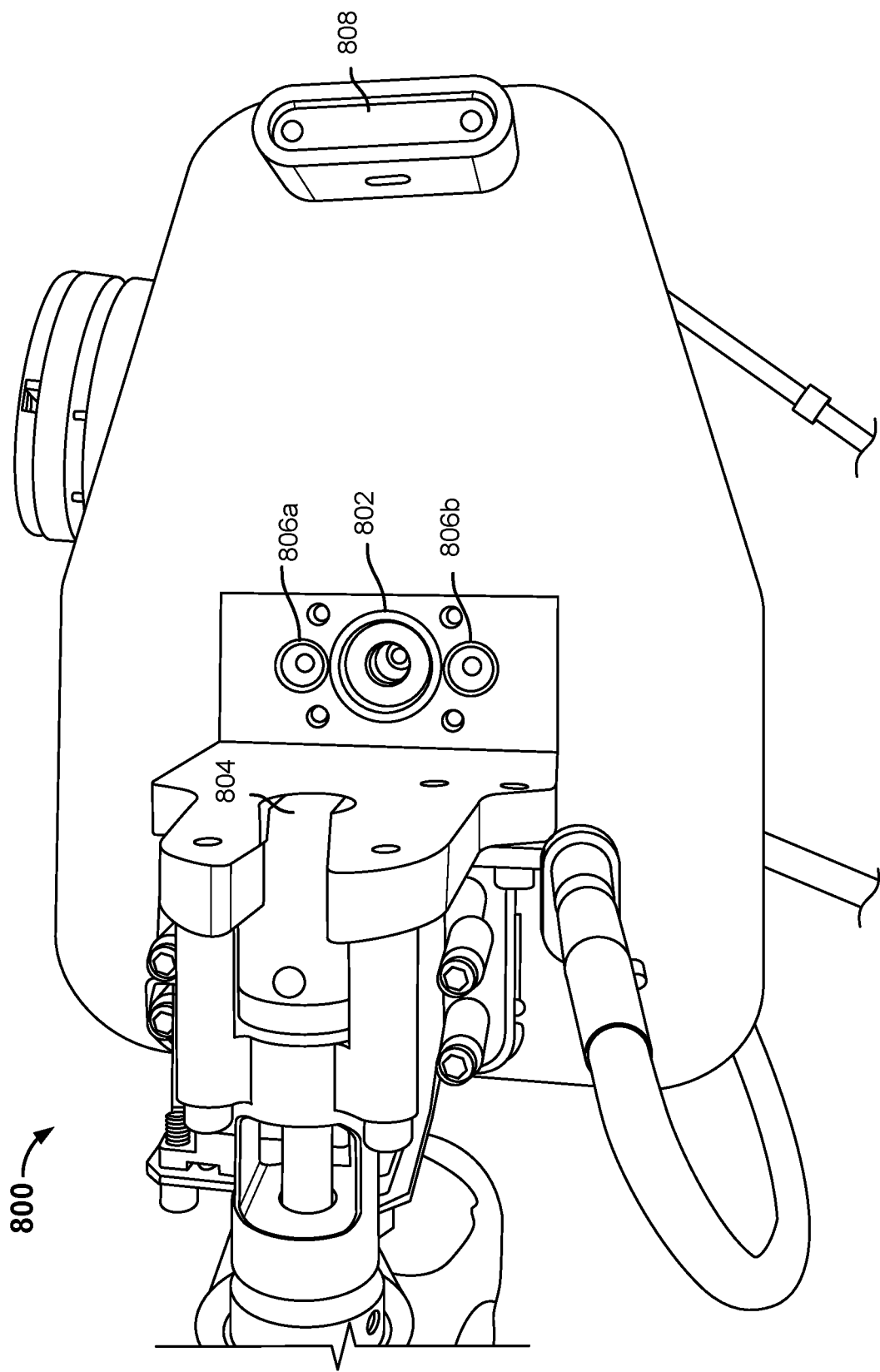
FIG. 8 is a diagram showing an example of an overhead view of a base of a rotational sprouter system (without the chamber or reservoir) in accordance with some embodiments.

FIG. 8 is a diagram showing an example of an overhead view of a base of a rotational sprouter system (without the chamber or reservoir) in accordance with some embodiments. In particular, base 214 of rotational sprouter system 200 of FIG. 2 can be implemented using example base 800 of FIG. 8. As shown in FIG. 8, base 800 includes features with which corresponding features on the reservoir (not shown in FIG. 8) are to mate. Specifically, the features of base 800 that are to mate with corresponding features of the reservoir include recesses 806a and 806b and also raised stand 808. As shown in FIG. 8, each of recess 806a, recess 806b and also raised stand 808 includes a recessed area in which a complementary feature at the bottom of the reservoir can slot into in order to align the position of the reservoir relative to base 800. Furthermore, base 800 includes drain valve 802 that can be activated to open such that water can be drained from a drainage hole of the reservoir that will align over drain valve 802. Base 800 also includes slot 804 of the drive mechanism. The end that extends from the end cap on the chamber can be inserted into slot 804 to ensure that the rotation of the drive mechanism will be transferred to the end cap and ultimately, to the chamber (e.g., containing seeds and water) to which the end cap is attached. Slot 804 may be a slotted circle with access from the top down (as shown) or it may be a closed circle (not shown) with access from the front-both would allow the endcap to be inserted and constrained within it such that the rotation of the drive mechanism could be transferred to the combination of the end cap and the chamber.

Figure 9:
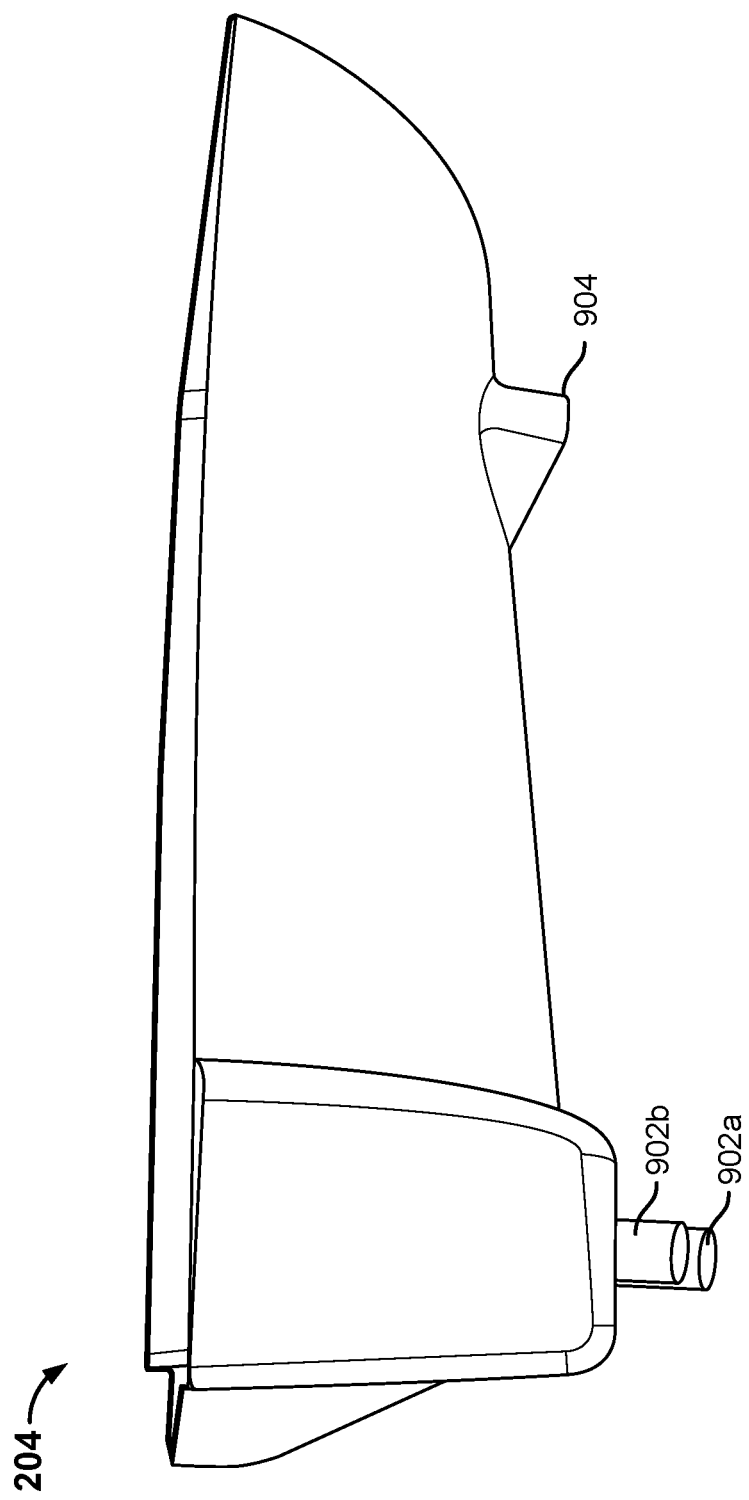
FIG. 9 is a diagram showing an example of a reservoir of a rotational sprouter in accordance with some embodiments.

FIG. 9 is a diagram showing an example of a reservoir of a rotational sprouter in accordance with some embodiments. In particular, reservoir 204 of rotational sprouter system 200 of FIG. 2 can be implemented using the example reservoir of FIG. 9. FIG. 9 shows a side view of the reservoir. The bottom of the reservoir includes features that are to mate with corresponding features on the base of the rotational sprouter system. For example, features 902a and 902b are to mate with recesses 806a and 806b of the example base that is shown in FIG. 8. Furthermore, feature 904 is to mate with/be inserted into raised stand 808 of the example base that is shown in FIG. 8. As described above, by aligning features on the bottom of the reservoir with corresponding features on the base of the rotational sprouter system, the reservoir can be securely coupled to the base to ensure that the water and chamber can securely stay contained within the reservoir. In some embodiments, the reservoir is designed such that after it is mated with the base of the rotational sprouter system, it is angled relative to the surface on which the system is placed. By being angled, the water contained in the reservoir can pool/flow to a side in which the drainage hole is located so as to facilitate the draining of water from the reservoir (when the drain valve is open). In some embodiments, reservoir 204 may also be attached to a sliding drawer that pulls out from the front of the rotation sprouter system. Reservoir 204 may include multiple components that are separable for each cleaning. When using a sliding drawer approach, a protrusion (e.g., a peg) of the end cap could be inserted into a closed circle/slot (e.g., slot 804 of FIG. 8) of the drive mechanism to engage the end cap with the drive mechanism.

Figure 10:
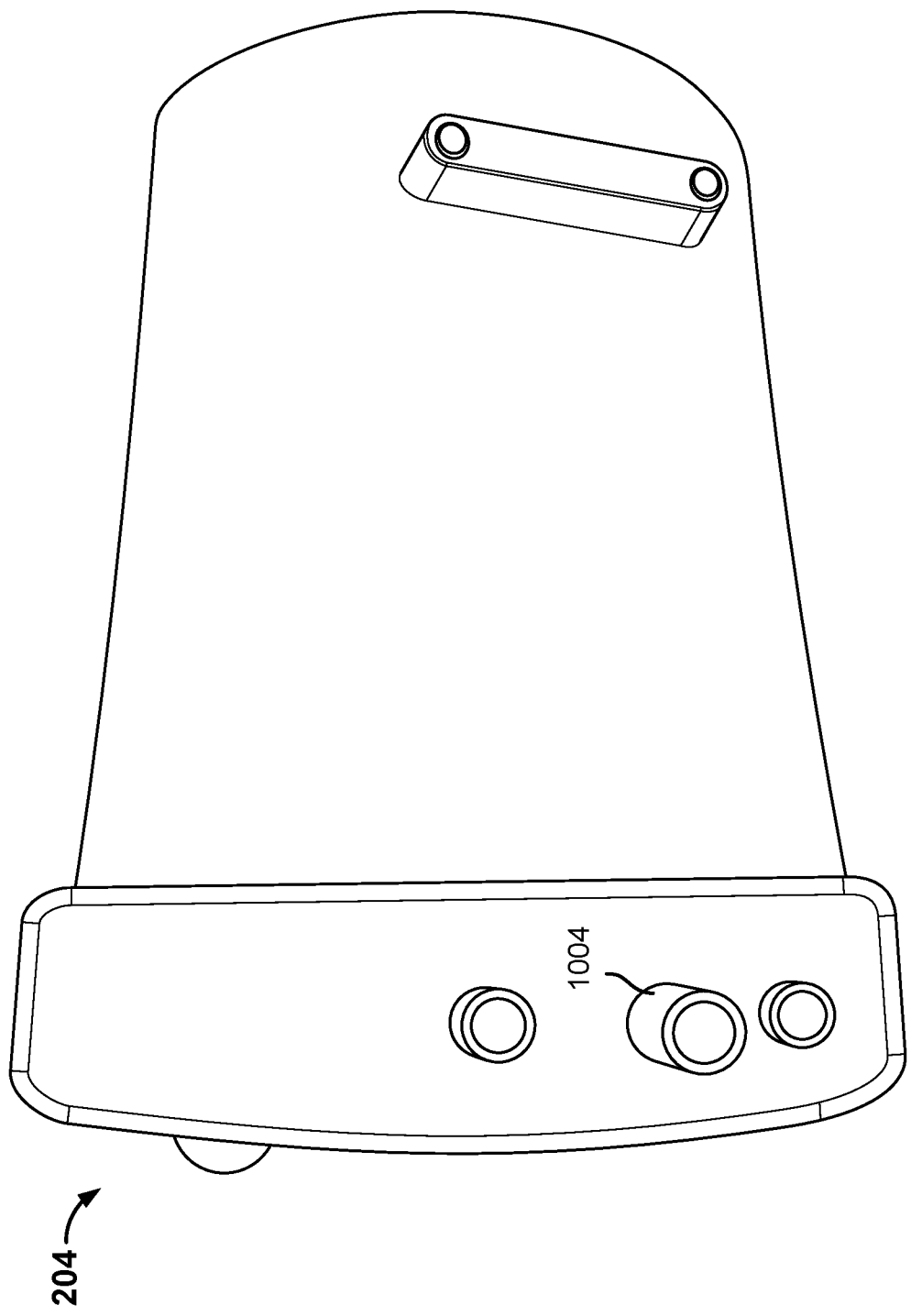
FIG. 10 is a diagram showing an example of a reservoir of a rotational sprouter in accordance with some embodiments.

FIG. 10 is a diagram showing an example of a reservoir of a rotational sprouter in accordance with some embodiments. In particular, reservoir 204 of rotational sprouter system 200 of FIG. 2 can be implemented using the example reservoir of FIG. 10. FIG. 10 shows a view of the bottom of the reservoir. In addition to showing the features that are to mate with corresponding features on the base of the rotational sprouter system that were shown in FIG. 9, FIG. 10 also shows drainage hole 1004 though which water can be drained out of the reservoir and into a corresponding tubing that leads to a used water storage or a sink/drain.

Figure 11:
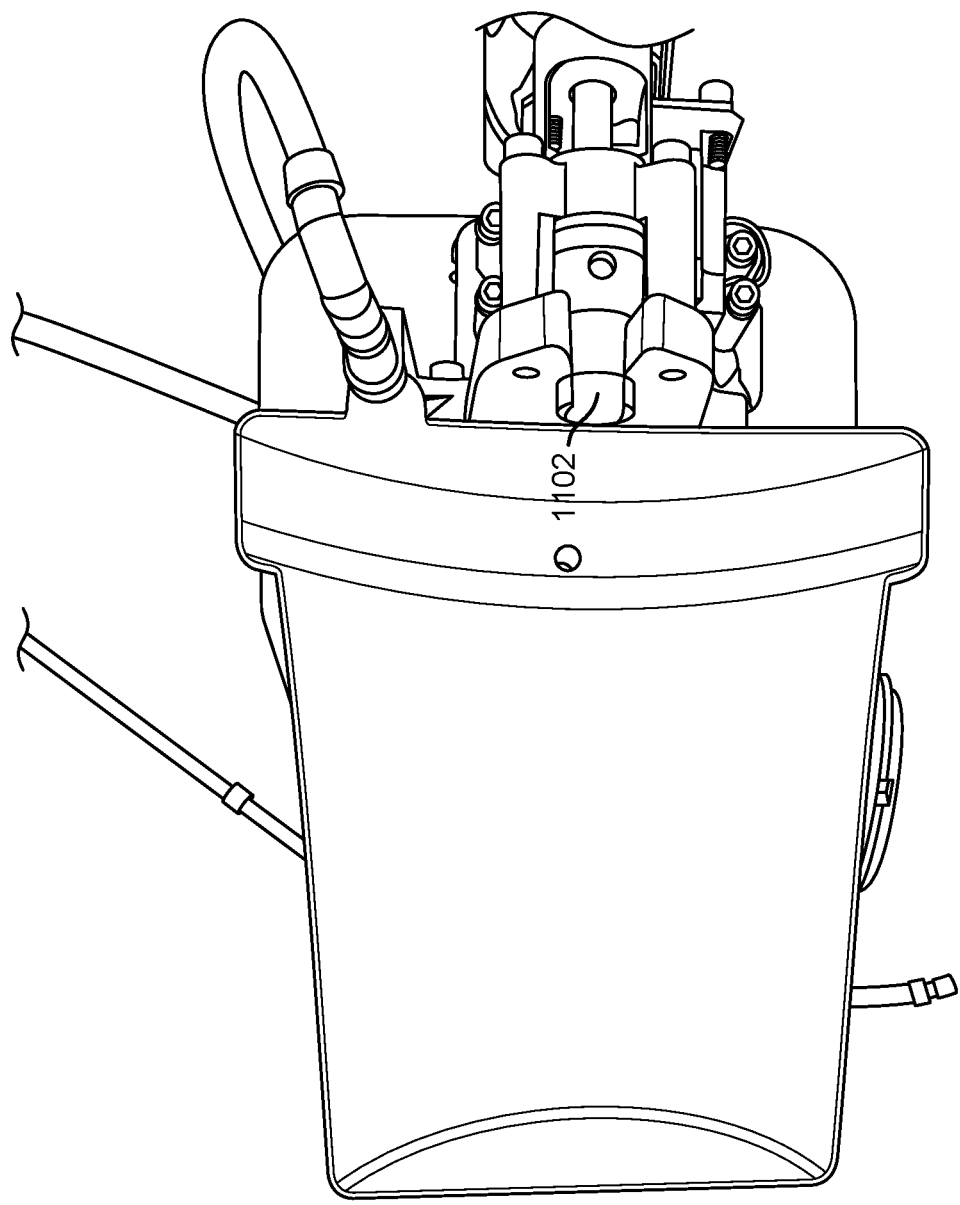
FIG. 11 is a diagram showing the reservoir that is coupled to the base of a rotational sprouter system.

FIG. 11 is a diagram showing the reservoir that is coupled to the base of a rotational sprouter system. FIG. 11 shows an overhead view of the reservoir (without the chamber having been placed inside the reservoir) after the features on the bottom exterior of the reservoir have been mated with corresponding features of the base below. Once the reservoir has been properly secured to and aligned with the base below, a chamber that is covered by a corresponding end cap can be placed within the reservoir and with a protruding peg of the end cap having been slotted or otherwise engaged into the drive mechanism 1102 of the rotational sprouter system.

Figure 12A:
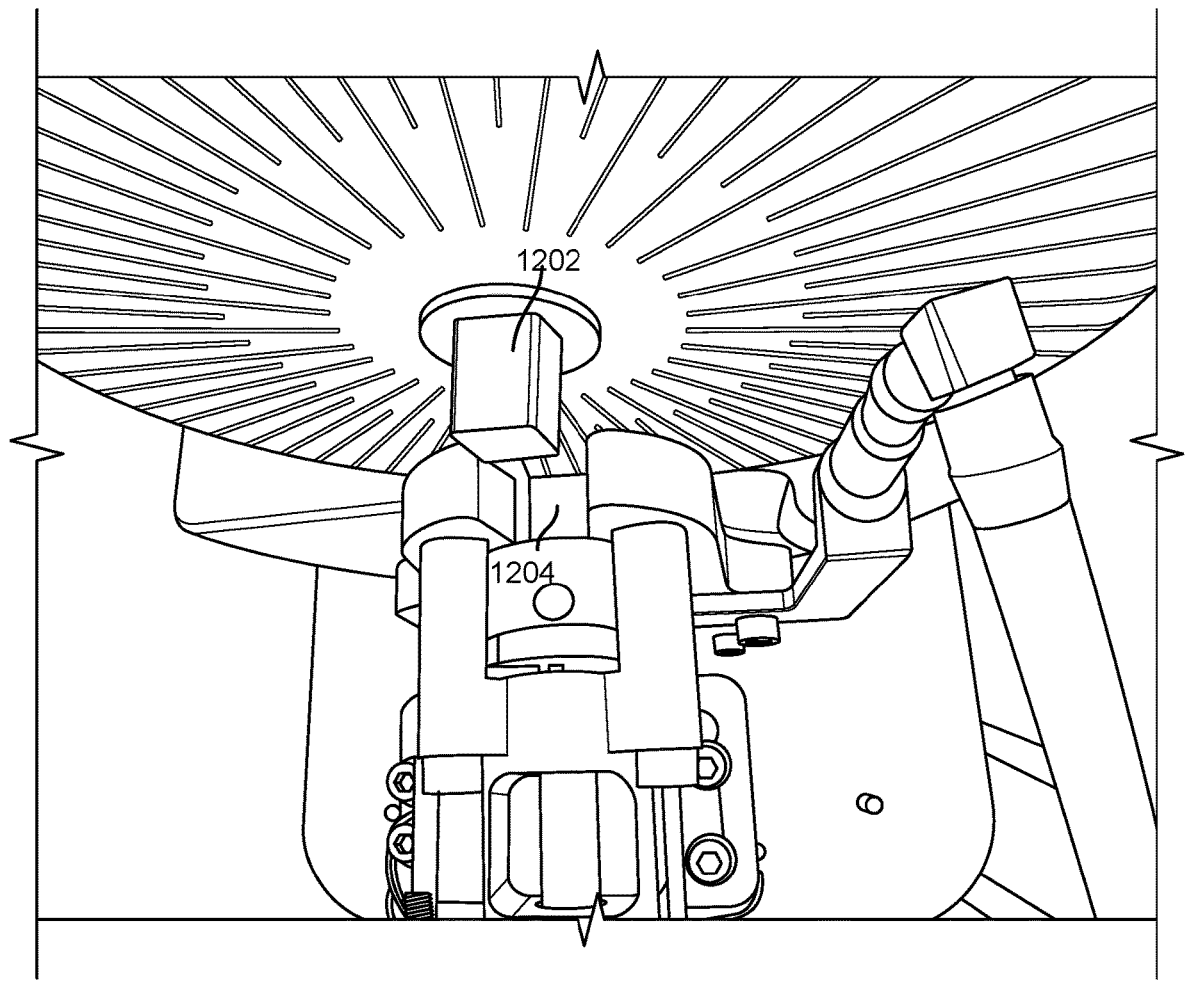
FIGS. 12A and 12B show an example type of engagement between an end cap on a chamber and a drive mechanism of a rotational sprouter system.
Figure 12B:
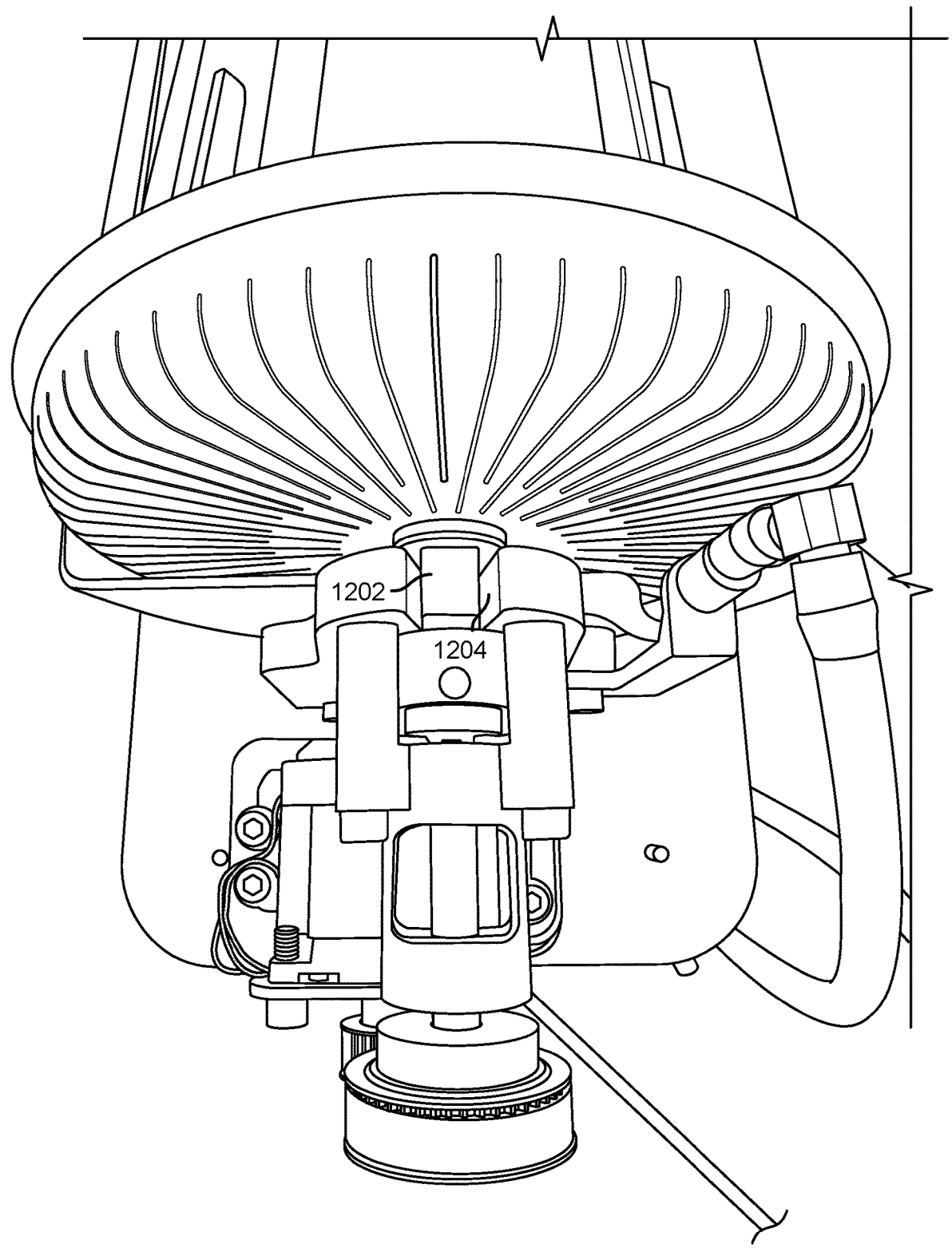

FIGS. 12A and 12B show an example type of engagement between an end cap on a chamber and a drive mechanism of a rotational sprouter system. In FIG. 12A, peg 1202 located at the center of a porous end cap that is fastened to a chamber containing seeds is to be slotted into female receptor 1204 of the drive mechanism that is powered by a motor. Female receptor 1204 comprises a cavity that matches the shape and dimensions of peg 1202 so that peg 1202 can slide into the cavity and become engaged with the drive mechanism. While the examples of FIGS. 12A and 12B show the peg that extends from the center of the end cap as being square, in actual implementation, the peg can be of any shape and the female receptor of the drive mechanism can then be any correspondingly shaped cavity into which the peg could be slotted. In FIG. 12B, peg 1202 located at the center of a porous end cap is shown to have already been slotted into female receptor 1204 of the drive mechanism that is powered by a motor. Due to the example square shape of the peg on the end cap and correspondingly shaped female receptor 1204, once peg 1202 is slotted into female receptor 1204, peg 1202 will not be moving relative to female receptor 1204 but moving with the drive mechanism to transfer the rotation to the chamber. In some embodiments, prior to the execution of a seed profile, the electronics that instruct the motor that actuates the drive mechanism will ensure that the opening of female receptor 1204 of the drive mechanism is pointed in a direction (e.g., upwards or perpendicular to the surface on which the rotational sprouter system is placed) such that peg 1202 is able to be inserted through the opening of female receptor 1204. In some other embodiments, instead of inserting peg 1202 into an open slot of the drive mechanism, peg 1202 can be inserted into a closed circle of the drive mechanism to engage with the drive mechanism.

Figure 13:
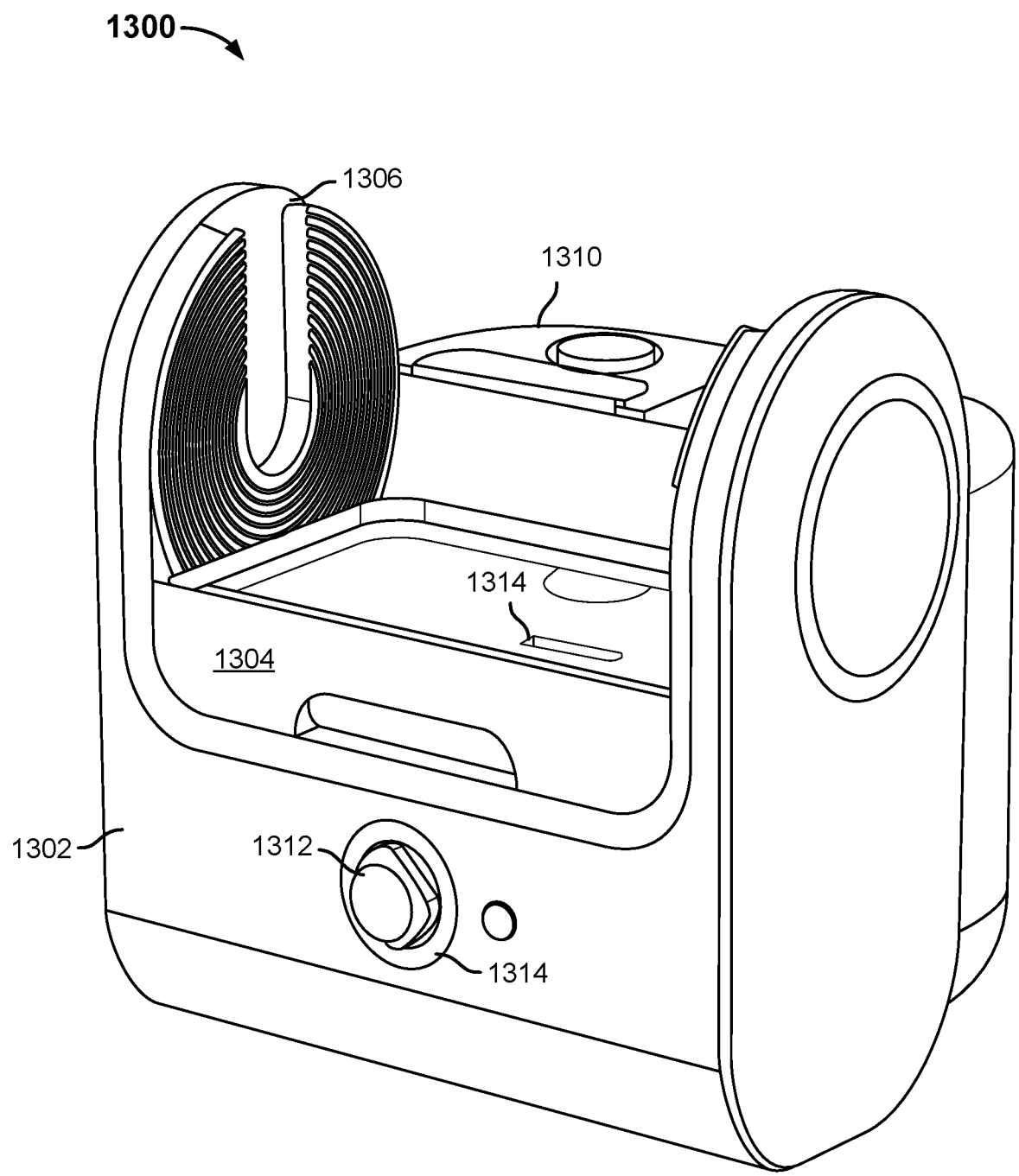
FIG. 13 is a diagram showing another example of a rotational sprouter system.

FIG. 13 is a diagram showing another example of a rotational sprouter system. In the example of FIG. 13, the base of the system, including the motor, the pump, tubing, used water storage/collection, and electronics (e.g., a memory, a processor, sensors, sanitization module, environmental subsystems, etc.), such as those described above for rotational sprouter system 100 of FIG. 1, is contained within housing 1302. Rotational sprouter system 1300 includes reservoir 1304 into which a chamber (partially) filled with seeds (not shown in FIG. 13) is to be inserted. Clean water can be pumped into reservoir 1304 via tubing that connects reservoir 1304 and clean water storage 1310. For example, clean water storage 1310 comprises a container of refillable water that slots into a corresponding cavity in housing 1302. For example, the chamber may be of a cylinder or frustum shape with one opening. A user can place seeds inside the chamber through the opening and then cover the opening with an end cap (not shown in FIG. 13 but the end cap can be similar to the examples described above in FIGS. 4 through 7, for instance). The end cap can also include a circular/cylindrical peg that extends from the center of the end cap and that can slot into (engage with) slot 1306 that is part of a drive mechanism. The end cap is porous and can therefore enable the flow of air and water in and out of the chamber. Prior to the execution of a seed profile that corresponds to a type of seeds that is detected within the chamber, the capped end of the chamber is engaged with slot 1306 and the body of the chamber is inserted into reservoir 1304. During the execution of the seed profile in at least one seed development phase, clean water is pumped into reservoir 1304 such that water seeps into the chamber via the porous end cap to hydrate the seeds therein and also, the drive mechanism is also activated to rotate the engaged end cap of the chamber, which will in turn rotate the attached chamber to facilitate the flow of water and air to the seeds. Also, during the execution of the seed profile in another seed development phase, drain valve 1314 that is located below reservoir 1304 is opened so that water in reservoir 1304 and the chamber can flow down the drainage tubing below reservoir 1304. The electronics of the rotational sprouter system can programmatically control the rotation of the drive mechanism, the release of clean water to the reservoir, the drainage of used water, and the activation of different environment subsystems through the sequence of one or more seed development phases of the executed seed profile. After the last seed development phase, the chamber, now full of sprouts that have emerged from the dry seeds that were initially placed into the chamber, can be detached from housing 1302. The sprouts contained in the chamber are then ready to be consumed. Button 1312 comprises a physical element within which the user can interact with, for example, to initiate the execution of a seed profile corresponding to the detected types of seeds within the chamber. Status light 1314 displays different colors/types of lights to indicate a current state associated with the execution of a seed profile. For example, status light 1314 may indicate a first color (e.g., green) when the system is ready to receive a new batch of seeds, status light 1314 may indicate a second color (e.g., blue) when the system is currently executing a seed profile on seeds contained with the chamber, and status light 1314 may indicate a third color (e.g., red) when a failure or other exception has been detected in connection with the execution of a seed profile (e.g., the drive mechanism has jammed, the clean water storage needs to be refilled).

Figure 14:
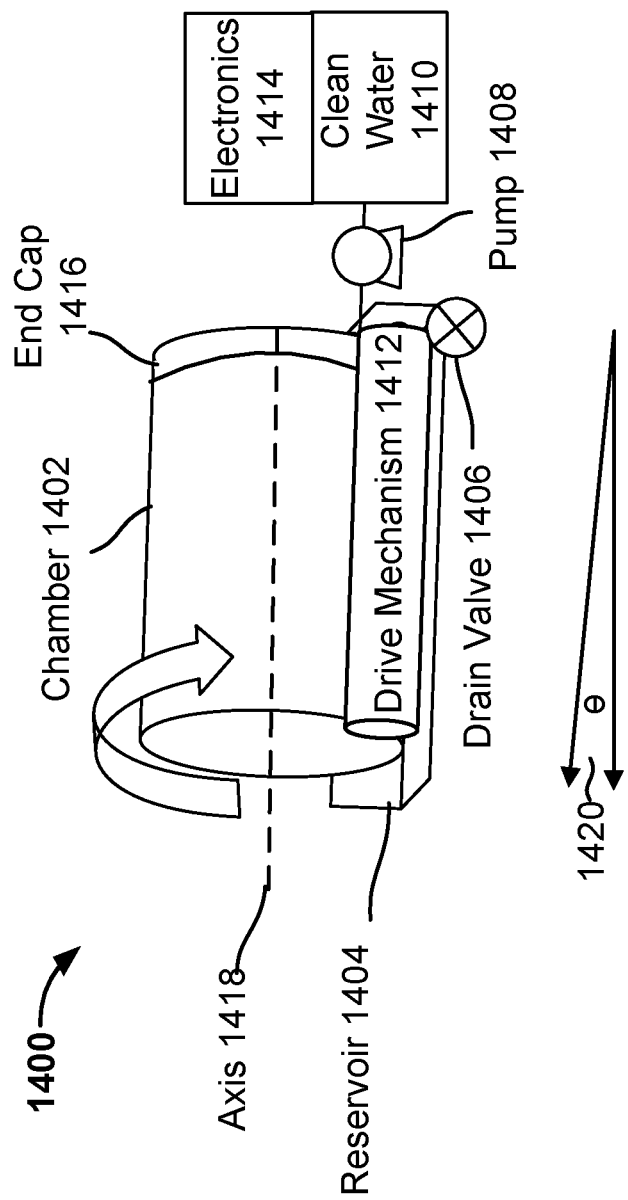
FIG. 14 is a diagram showing yet another example of a rotational sprouter system.

FIG. 14 is a diagram showing yet another example of a rotational sprouter system. Rotational sprouter system 1400 is similar to rotational sprouter system 100 of FIG. 1 except that drive mechanism 1412 powers the rotation of chamber 1402, which contains seeds, as a roller that is flush against the side of chamber 1402. In comparison, rotational sprouter system 100 includes drive mechanism 112 that drives chamber 102 by being coupled to one end of chamber 102. In the example of FIG. 14, instead of engaging end cap 1416 that covers an opening of chamber 1402, drive mechanism 1412 comprises a rotating roller that is flush against chamber 1402. Drive mechanism 1412 is activated by a motor to rotate about its axis. Drive mechanism 1412 comprises a roller with a smaller diameter than the diameter of chamber 1402. When drive mechanism 1412 is activated to rotate, chamber 1402 is also caused to rotate about its own axis 1418 by virtue of being located flush against chamber 1402. Because end cap 1416 does not need to engage with a slot type of female receptor on drive mechanism 1412 in rotational sprouter system 1400, end cap 1416 may not include a peg that was used for such a type of engagement. Otherwise, end cap 1416 should still include pores to enable water and air to flow in and out of chamber 1402 from reservoir 1404.

In some embodiments, aside from the differences between rotational sprouter system 100 and rotational sprouter system 1400 described above, reservoir 1404, drain valve 1406, pump 1408, electronics 1414, clean water storage 1410, and angle θ 1420 of rotational sprouter system 1400 can function similarly to respective reservoir 104, drain valve 106, pump 108, electronics 114, clean water storage 110, and angle θ 120 that were described above for rotational sprouter system 100.

Figure 15:
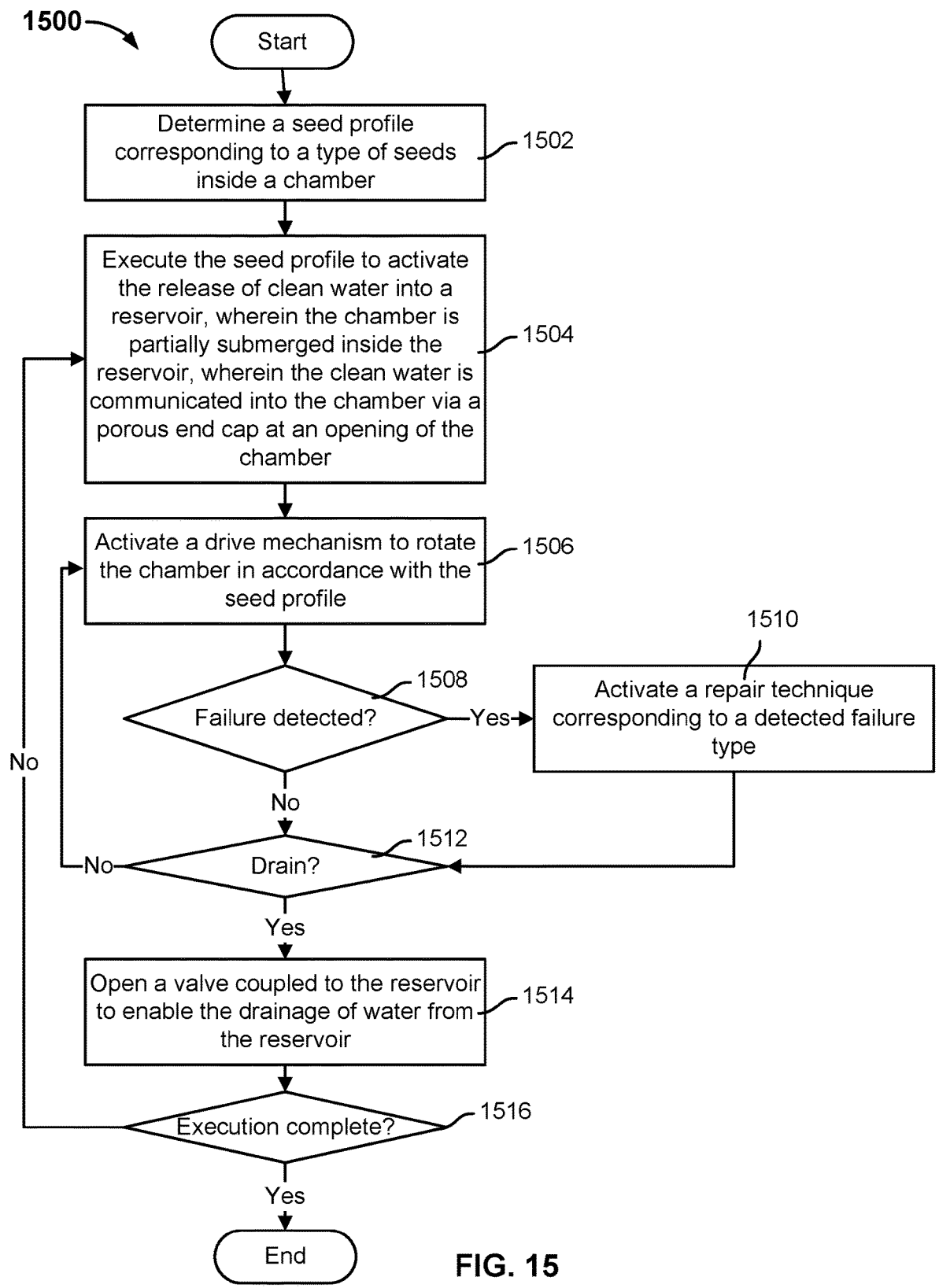
FIG. 15 is a flow diagram showing an example process for executing a seed profile in accordance with some embodiments.

FIG. 15 is a flow diagram showing an example process for executing a seed profile in accordance with some embodiments. In some embodiments, process 1500 is implemented, at least in part, by a rotational sprouter system (e.g., rotation sprouter system 100 of FIG. 1)

At 1502, a seed profile corresponding to a type of seeds inside a chamber of the rotational sprouter system is determined. The user can place (dry) seeds to be sprouted into the chamber that is to be inserted into the rotational sprouter system. In some embodiments, the seed type of the seeds inside the chamber can be determined based on a user input (e.g., into a user interface that is physically located on the rotational sprouter system or into a user interface that is presented by an application that is running on a client device that is wirelessly connected to the rotational sprouter system), scanning of an identifier (e.g., bar code, quick response (QR) code) that is printed on a package of the seeds (e.g., by a sensor physically located on the rotational sprouter system or that is part of the client device), and/or analysis of an image of the seeds within the chamber. The rotational sprouter system includes a non-volatile memory that is configured to store seed profiles corresponding to different seed types. In some embodiments, each seed profile comprises computer code that can be executed by a processor of the rotational sprouter system to control components (e.g., water pumps, motors, drain valves, sensors, environmental subsystems) to implement a sequence of seed development phases to encourage the growth of sprouts from the seeds deposited within the chamber. A seed development phase describes, for example, one or more of the following target specifications: a direction to rotate the chamber, an amount of clean water to release into the reservoir, whether water should be actively drained from the reservoir, a target time duration to implement the conditions of the phase, and one or more target environmental measurements (e.g., humidity, temperature, water pH).

At 1504, the seed profile is executed to activate the release of clean water into a reservoir, wherein the chamber is partially submerged inside the reservoir, wherein the clean water is communicated into the chamber via a porous end cap at an opening of the chamber. In some embodiments, the rotational sprouter system (specifically, a processor of the system) is configured to (e.g., iteratively) execute (e.g., each seed development phase of) the seed profile by controlling the components of the rotational sprouter system to meet the target conditions of the current seed development phase of the seed profile including the release (e.g., via pumping) of clean water into the reservoir. The chamber, containing seeds, that is sitting within the reservoir is enclosed by a porous end cap, which communicates water (and air) into (and out of) the chamber. As such, by filling the reservoir with water, water is provided into the chamber to hydrate the seeds within.

At 1506, a drive mechanism is activated to rotate the chamber in accordance with the seed profile. Executing the (current seed development phase of the) seed profile may include activating the rotation of the chamber according to a specified speed (e.g., a specified RPM) and/or direction (e.g., clockwise or counterclockwise). In some embodiments, the drive mechanism is coupled to the porous end cap that is coupled to the chamber and as such, rotation of the end cap by the drive mechanism in turn rotates the chamber within the reservoir. The rotation of the chamber containing seeds and water allows the seeds to become better hydrated and also promotes an ideally humidified environment throughout the inside of the chamber, which facilitates better sprout growth. In some embodiments, the end cap includes agitator bars that extend inside the chamber and such bars can break up any undesirable seed or sprout balls that may have formed within the chamber. Tight clumps of seeds or sprouts could hinder sprout growth and therefore should be separated.

Where the rotational sprouter system includes target environmental conditions (e.g., humidity, temperature, light), corresponding environment sensors, and control subsystems, the actual/current sensor feedback/measurements can be compared against the target conditions specified in the seed profile. In the event that the actual/current sensor feedback/measurements deviated from the target conditions beyond a threshold, then the corresponding environmental control subsystems (e.g., fan, heater, light) can be activated to modify the environment within or around the chamber to meet the target conditions.

At 1508, whether a failure is detected is determined. In the event that a failure in the rotational sprouter system is determined, control is transferred to 1510. Otherwise, in the event that a failure in the rotational sprouter system is not determined, control is transferred to 1512. In some embodiments, in the event that a current sensor measuring the current flowing through the drive mechanism measures a current reading that is more than a deviation from a target current, then an issue associated with the drive mechanism (e.g., a jam or a misalignment between the chamber and the drive mechanism) can be detected. In some embodiments, in the event that an accelerometer measuring the acceleration of the system flowing through the drive mechanism measures an acceleration reading that is more than a deviation from a target acceleration, then an issue (e.g., the system is not placed on a stable/flat surface) associated with the drive mechanism can be detected. Other types of failures of at least a portion of the rotational sprouter system can be detected using other sensor-related techniques.

At 1510, a repair technique corresponding to a detected failure type is activated. In some embodiments, the repair technique may include presenting an alert at a user interface or presenting a predetermined type of a status light to a user to prompt the user to manually remediate the issue.

At 1512, whether water is to be drained from the reservoir is determined. In the event that water is to be drained from the reservoir, control is transferred to 1514. Otherwise, in the event that water is not to be drained from the reservoir, control is returned to 1506. Executing the (current seed development phase of the) seed profile may include to open a drain valve coupled to the reservoir to drain the water from the reservoir and chamber. In some embodiments, after the drain valve is opened for a duration, the valve can be closed again (in anticipation of the additional clean water being added to the reservoir to hydrate the seeds/sprouts inside the chamber).

At 1514, a valve coupled to the reservoir is opened to enable the drainage of water from the reservoir.

At 1516, whether the execution of the seed profile is complete is determined. In the event that the execution of the seed profile is complete, process 1500 ends. Otherwise, in the event that the execution of the seed profile has not completed, control is returned to 1504 to potentially activate the release of more clean water into the reservoir in accordance with a (next) seed development phase in the seed profile. When all the seed development phases of the seed profile are iterated through, then the execution of the seed profile is complete. Furthermore, after the seed profile is completely executed, the dry seeds that were deposited into the chamber should have sprouted (that are ready to be consumed). In some embodiments, after the completion of the execution of the seed profile, the system may display an indication (e.g., via a status light) to prompt the user to remove the chamber full of sprouts from the system. In some embodiments, the user can also provide feedback about the sprouts that have grown (e.g., whether they should be maintained in the system for a longer duration and/or whether some seeds have not germinated) via a user interface associated with the system and the executed seed profile can be modified accordingly so that the next execution of the profile will include changes made in light of the user feedback.

As described herein, in various embodiments, a rotational sprouter system provides one or more of the following features:

1. Automatic irrigation for a crop of sprouts.
2. Automatic control of airflow to the growing chamber.
3. Automatic agitation of the crop during growth.
4. Seed-specific profiles that alter the growing inputs to suit specific seeds (if needed)
5. Minimal countertop footprint.
6. Ability to scale by adding additional units in a space effective manner. For example, multiple instances of the rotational sprouter system can be linked or stacked together.
7. Climate control of the growing chamber to maintain safety and crop quality.
8. Pathogenic safety of crop.
9. Accommodation to various different climates.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotational sprouter system, comprising:
   a chamber comprising an opening;
   a porous end cap that is configured to engage the opening of the chamber, wherein the porous end cap comprises pores that extend over a lip of the opening of the chamber;
   a reservoir;
   wherein the chamber and the porous end cap are at least partially submerged in the reservoir such that an interior of the chamber is in communication with the reservoir via the porous end cap; and
   wherein the porous end cap is adapted to engage a drive mechanism that is configured to rotate the chamber and the porous end cap while the chamber and the porous end cap are at least partially submerged in the reservoir.

2. The rotational sprouter system of claim 1, further comprising an irrigation system that is configured to release clean water into the reservoir.

3. The rotational sprouter system of claim 2, wherein the irrigation system comprises a pump that is configured to pump the clean water from a clean water source via tubing into the reservoir.

4. The rotational sprouter system of claim 1, wherein the porous end cap comprises agitator bars that extend into the chamber when the porous end cap is engaged with the opening of the chamber.

5. The rotational sprouter system of claim 1, wherein a shape of the chamber is a cylinder or a frustum.

6. The rotational sprouter system of claim 1, further comprising a drain valve that is configured to open to drain water from the reservoir.

7. The rotational sprouter system of claim 1, further comprising a sensor that is configured to detect a jam associated with the drive mechanism.

8. The rotational sprouter system of claim 1, further comprising a processor configured to:
   detect a seed type associated with seeds within the chamber; and
   obtain a seed profile corresponding to the seed type.

9. The rotational sprouter system of claim 8, further comprising:
   a sensor that is configured to determine a measurement inside the chamber; and
   wherein the processor is further configured to:
      compare the measurement to a target condition specified in the seed profile; and
      in response to a determination that the measurement deviates from the target condition beyond a threshold, control an environmental subsystem to modify an environment within the chamber.

10. The rotational sprouter system of claim 9, wherein the sensor comprises a temperature sensor.

11. The rotational sprouter system of claim 10, wherein the environmental subsystem comprises a fan or a heater.

12. The rotational sprouter system of claim 9, wherein the sensor comprises a humidity sensor.

13. The rotational sprouter system of claim 9, wherein the sensor comprises a water level sensor.

14. The rotational sprouter system of claim 9, wherein the environmental subsystem comprises an irrigation system.

15. The rotational sprouter system of claim 9, wherein the environmental subsystem comprises a light.

16. The rotational sprouter system of claim 1, further comprising a status light that is configured to display a light that is indicative of a current status of the rotational sprouter system.

17. The rotational sprouter system of claim 1, wherein the chamber is tilted relative to a surface on which the rotational sprouter system sits.

18. The rotational sprouter system of claim 1, wherein the porous end cap comprises stainless steel.

19. A rotational sprouter system, comprising:
   a chamber comprising an opening;
   a porous end cap that is configured to engage the opening of the chamber;
   a reservoir;
   an irrigation system that is configured to release clean water into the reservoir, wherein the irrigation system comprises a pump that is configured to pump the clean water from a clean water source via tubing into the reservoir;
   wherein the chamber and the porous end cap are at least partially submerged in the reservoir such that an interior of the chamber is in communication with the reservoir via the porous end cap; and
   wherein the porous end cap is adapted to engage a drive mechanism that is configured to rotate the chamber and the porous end cap while the chamber and the porous end cap are at least partially submerged in the reservoir.

20. A rotational sprouter system, comprising:
   a chamber comprising an opening;
   a porous end cap that is configured to engage the opening of the chamber;
   a reservoir;
   a drain valve that is configured to open to drain water from the reservoir;
   wherein the chamber and the porous end cap are at least partially submerged in the reservoir such that an interior of the chamber is in communication with the reservoir via the porous end cap; and
   wherein the porous end cap is adapted to engage a drive mechanism that is configured to rotate the chamber and the porous end cap while the chamber and the porous end cap are at least partially submerged in the reservoir.

21. A rotational sprouter system, comprising:
   a chamber comprising an opening;
   a porous end cap that is configured to engage the opening of the chamber;
   a reservoir;
   wherein the chamber and the porous end cap are at least partially submerged in the reservoir such that an interior of the chamber is in communication with the reservoir via the porous end cap;
   wherein the porous end cap is adapted to engage a drive mechanism that is configured to rotate the chamber and the porous end cap while the chamber and the porous end cap are at least partially submerged in the reservoir;
   a sensor that is configured to determine a measurement inside the chamber, wherein the sensor comprises a temperature sensor; and
   a processor configured to:
      detect a seed type associated with seeds within the chamber;
      obtain a seed profile corresponding to the seed type;
      compare the measurement to a target condition specified in the seed profile; and
      in response to a determination that the measurement deviates from the target condition beyond a threshold, control an environmental subsystem to modify an environment within the chamber, wherein the environmental subsystem comprises a fan or a heater.

22. A rotational sprouter system, comprising:
   a chamber comprising an opening;
   a porous end cap that is configured to engage the opening of the chamber;
   a reservoir;
   wherein the chamber and the porous end cap are at least partially submerged in the reservoir such that an interior of the chamber is in communication with the reservoir via the porous end cap;
   wherein the porous end cap is adapted to engage a drive mechanism that is configured to rotate the chamber and the porous end cap while the chamber and the porous end cap are at least partially submerged in the reservoir;
   a sensor that is configured to determine a measurement inside the chamber; and
   a processor configured to:
      detect a seed type associated with seeds within the chamber;
      obtain a seed profile corresponding to the seed type;
      compare the measurement to a target condition specified in the seed profile; and
      in response to a determination that the measurement deviates from the target condition beyond a threshold, control an environmental subsystem to modify an environment within the chamber, wherein the environmental subsystem comprises a light.

23. A rotational sprouter system, comprising:
- a chamber comprising an opening, wherein the chamber is tilted relative to a surface on which the rotational sprouter system sits;
- a porous end cap that is configured to engage the opening of the chamber;
- a reservoir;
- wherein the chamber and the porous end cap are at least partially submerged in the reservoir such that an interior of the chamber is in communication with the reservoir via the porous end cap; and
- wherein the porous end cap is adapted to engage a drive mechanism that is configured to rotate the chamber and the porous end cap while the chamber and the porous end cap are at least partially submerged in the reservoir.

* * * * *